No. 879,172.
PATENTED FEB. 18, 1908.
J. A. HUFF.
ANIMAL WEANER.
APPLICATION FILED JULY 8, 1907.
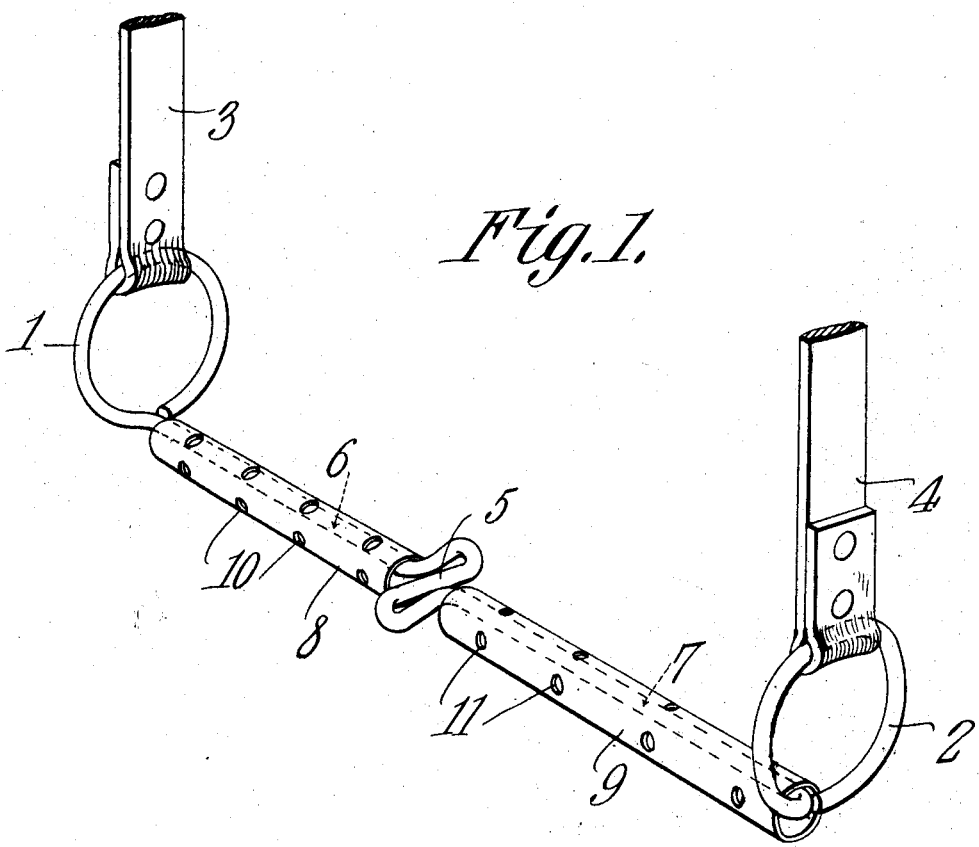
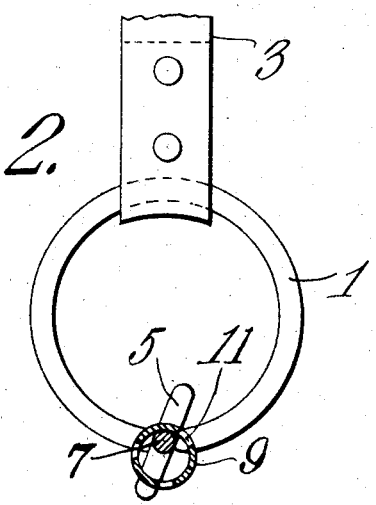
WITNESSES:
James A. Huff, INVENTOR.
By C. A. Snow & Co.
ATTORNEYS

UNITED STATES PATENT OFFICE.

JAMES ABRAM HUFF, OF MEMPHIS, TENNESSEE.

ANIMAL-WEANER.

No. 879,172.      Specification of Letters Patent.      Patented Feb. 18, 1908.

Application filed July 8, 1907. Serial No. 382,697.

To all whom it may concern:

Be it known that I, JAMES ABRAM HUFF, a citizen of the United States, residing at Memphis, in the county of Shelby and State of Tennessee, have invented a new and useful Animal-Weaner, of which the following is a specification.

My present invention relates to improvements in devices for weaning calves and other animals, and for similar purposes, and it has for its object to provide an improved device of this character that admits air to the mouth or tongue of the animal to prevent the formation of a vacuum, and thus rendering the animal incapable of sucking, although the device does not interfere with the feeding of the animal.

Another object of the invention is to provide a device of this character that is self cleaning, that is to say, particles of bran and other food fed to the animal cannot become packed into the device in such a way as to prevent the entrance of air and thus defeat the purpose of the device.

To these and other ends, the invention comprises the various novel features of construction and combination and arrangement of parts, which will be hereinafter more fully described and pointed out particularly in the appended claims.

In the accompanying drawing:—Figure 1 is a perspective view of a device of the character described constructed in accordance with the present invention. Fig. 2 represents a transverse section of the device shown in Fig. 1.

Corresponding parts in the several figures are indicated throughout by similar characters of reference.

The device shown in the present embodiment of the invention comprises generally a bit adapted to be inserted into the mouth of the animal and is provided with loops or other devices at its outer ends to receive a bridle or strap to secure it in position, the bit shown in the present instance being composed of a single piece of wire of suitable strength having loops or rings 1 and 2 formed at its opposite ends to receive the strap ends or other securing devices 3 and 4, a strap being generally employed which extends over the head of the animal. The intermediate portion of the wire is doubled, as at 5, to form a thrust shoulder which separates a pair of journals 6 and 7 which are formed on the wire at points intermediate the shoulder and the attaching loops or rings.

The bit formed by the wire is of a length sufficient to extend somewhat beyond the opposite sides of the animal's mouth, and on the journal portions of the bit are loosely fitted a pair of air tubes 8 and 9 which are arranged between the intermediate shoulder portion of the bit and the loops at the opposite ends thereof, the inner ends of the tubes being open and held in separated relation by the thrust shoulder formed by the doubled portion of the wire. The walls of the tubes are provided with sets of perforations 10 and 11 through which air drawn into the outer ends of the air tubes may enter the mouth of the animal, so that the animal is unable to create a partial vacuum in the mouth, although the animal is free to feed itself. During mastication of the food, the air tubes will constantly change their positions relatively to the wire supporting them by reason of the loose fit of the tubes on the wire and, consequently, any food, such as bran, or the like, that may enter the air tubes through the perforations therein will be ejected by the wire, so that the food cannot become packed into the tubes and thereby prevent the entrance of air.

What is claimed is:—

1. A device of the character described embodying a bit adapted to fit the animal's mouth, perforated air tubes mounted loosely on the bit, and means for separating the proximate ends of the tubes.

2. A device of the character described embodying a bit composed of a strip of material having a pair of attaching loops formed on its opposite ends and provided with an intermediate doubled portion forming a pair of separated journals on the bit, and a pair of air tubes loosely mounted on the journals and separated by the said doubled portion, the outer ends of the tubes opening at the sides of the animal's mouth, and the tubes being provided with perforations for discharging air into the animal's mouth.

In testimony that I claim the foregoing as my own, I have hereto affixed my signature in the presence of two witnesses.

JAMES ABRAM HUFF.

Witnesses:
     L. LEHMAN,
     A. J. WILLIFORD.